United States Patent [19]

Benthake et al.

[11] 3,906,818

[45] Sept. 23, 1975

[54] SINGLE OR MULTI-STEP PLANETARY GEARING

[75] Inventors: Heinz Benthake, Mulheim (Ruhr); Josef Kunnen, Dusseldorf-Meerbusch, both of Germany

[73] Assignee: Rheinstahl AG, Germany

[22] Filed: Feb. 6, 1974

[21] Appl. No.: 440,002

[30] Foreign Application Priority Data
Feb. 7, 1973 Germany............................ 2305780

[52] U.S. Cl................................. 74/801; 74/665 S
[51] Int. Cl.[2]........................................... F16H 1/28
[58] Field of Search.......... 74/750 R, 740, 682, 801, 74/665 S

[56] References Cited
UNITED STATES PATENTS

| | | | |
|---|---|---|---|
| 2,956,451 | 10/1960 | Bowman | 74/801 |
| 3,459,070 | 8/1969 | Holdeman | 74/801 X |
| 3,550,469 | 12/1970 | Morse | 74/801 X |

Primary Examiner—Benjamin W. Wyche
Assistant Examiner—Frank H. McKenzie, Jr.
Attorney, Agent, or Firm—McGlew and Tuttle

[57] ABSTRACT

A single or multi-step planetary gearing comprises a sun wheel for each speed step which is engaged by a planet carrier having the planetary gears. The planetary carriers with the planetary gears are arranged within a casing having an internal gear which is in meshing engagement with the planetary gears and the carriers are engaged through their internal gearing with the associated sun gears. The casing is closed at one end by a casing cover. The planet gears are mounted on the planet carriers in an overhung position and check shoulders are provided which bear axially against the associated gears which are carried on either the planet carriers or the casing cover.

6 Claims, 1 Drawing Figure

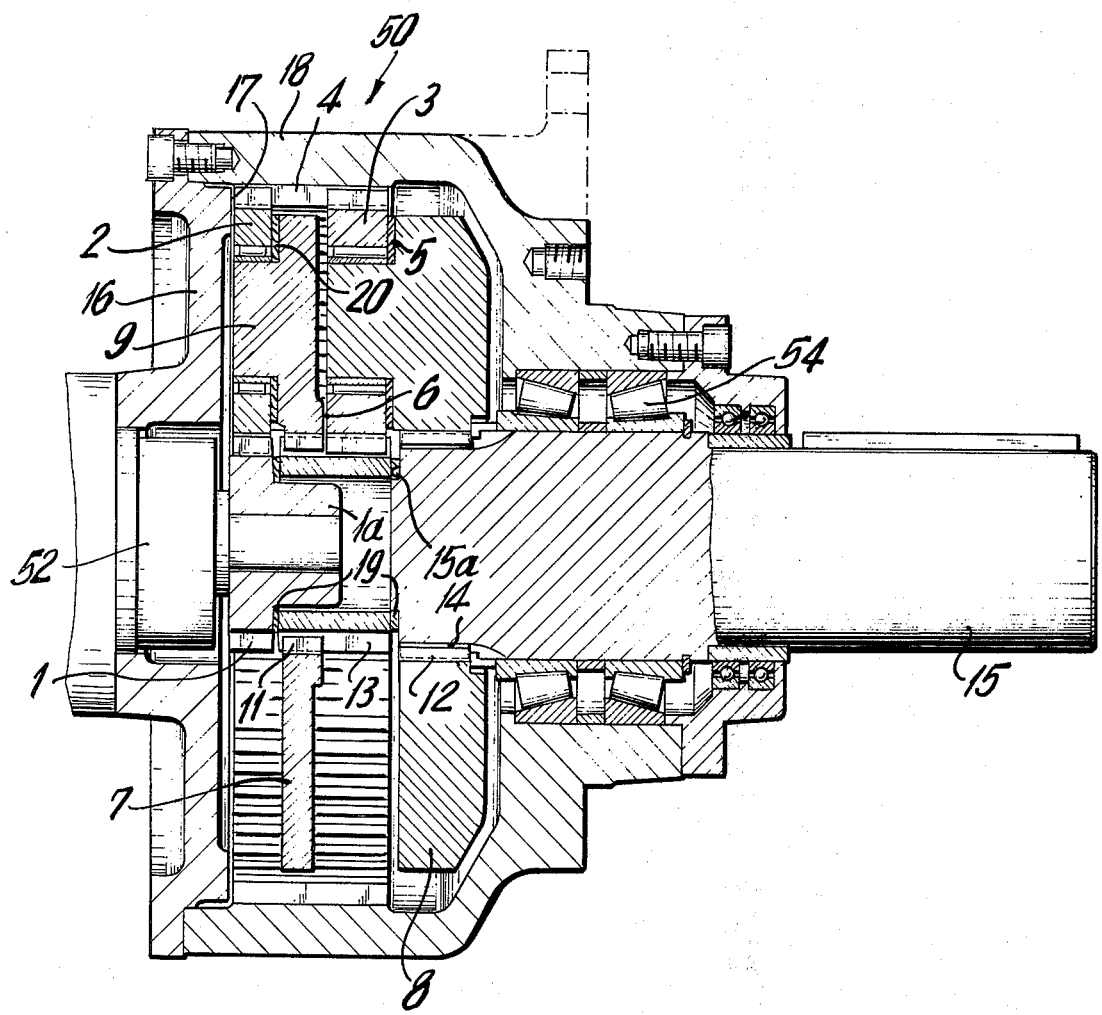

SINGLE OR MULTI-STEP PLANETARY GEARING

BACKGROUND OF THE INVENTION

This invention relates in general to the construction of gearing and in particular to a new and useful single or multistep planetary gearing in which each planet carrier is connected to the sun wheel of the next step and which is of relatively compact design.

DESCRIPTION OF THE PRIOR ART

Single or multi-step planetary gear mechanisms in which each planet carrier is connected to the sun wheel of the next step are known. As a rule such gearings have a relatively extended overall length which is undesirable for reasons of space and expense. It has been proposed to design such gearings in a space saving manner and the construction of such a type comprises planet carriers which are held in position against each other by sliding guide disks. With such constructions the overall length is not reduced satisfactorily.

SUMMARY OF THE INVENTION

The invention provides a construction in which the overall length of the planetary gear mechanism is reduced to a minimum as determined only from the width of the teeth and of the planetary carriers which are necessary for the particular design strength desired. With the invention the planet gears are mounted on planet carriers at trunnion portions in an overhung position. Check shoulders for each of the planet gears are provided at the high speed side and they are defined either on the planet carriers or on the casing cover. The check shoulders are provided on the planet carriers close to the inner meshing zone of the planet gears. In the case of the check shoulders formed on the casing it is located close to the outer meshing zone of the planet gear.

With the inventive construction the planet gears are retained on the trunnions of the planet carriers by abutting laterally against the check shoulder of the adjacent planet carrier or the casing cover. This is preferably at a location where the two component parts have approximately the same angular velocity so that they are not exposed to any notable wear. At the same time the planet carriers are mutually held in place. The mounting in an overhung position of the planet gears saves much of the overall length. In addition it is possible to entirely dispense with the axial fitting of the planet wheels on the trunnions of the planet carriers and to use for example cylindrical roller or needle bearings which have the advantage of a higher load carrying capacity particularly the solid roller types.

In a variation of the inventive design loose slide rings may be used instead of the integrally formed check shoulders.

In accordance with the invention there is provided a planetary gearing construction which includes at least one sun wheel with at least one planetary carrier therearound having a trunnion offset therefrom in an axial direction for supporting the planetary gears in an overhung position and wherein either the next adjacent planetary gear carrier or the housing is provided with a shoulder which bears against the planetary gearing in an axial direction to maintain it in position on the associated trunnion.

A further object of the invention is to provide planetary gearing which is simple in design, rugged in construction and economical to manufacture.

For an understanding of the principles of the invention, reference is made to the following description of a typical embodiment thereof as illustrated in the accompanying drawings.

BRIEF DESCRIPTION OF THE DRAWING

The only FIGURE of the drawing is an axial sectional view of a planetary gearing constructed in accordance with the invention.

GENERAL DESCRIPTION OF THE PREFERRED EMBODIMENT

Referring to the drawing in particular the invention embodied therein comprises a planetary gearing generally designated 50 which includes an outer casing 18 having an internal gear 4 and an end cover or casing cover 16 which rotatably supports an input shaft 52. A sun gear 1 is affixed to the input shaft for rotation therewith and it includes an axially extending hub portion 1a. The input shaft 52 is adapted to be connected to a driving machine (not shown).

In accordance with the invention a first step of the gearing includes the sun wheel 1 and planet wheel 2 which are carried by a planet carrier 7 having an internal gear 11 which meshes with the gearing of a sun gear 13 which is rotatably supported around the hub portion 1a on rings 19 which are disposed between the hub portion 1a and an indented portion 15a of an output shaft 15. The output shaft 15 is rotatably supported on bearings 54 at the opposite end of the housing 50 from the casing cover 16. The planet gears engage with the sun gear 1 and also with the internal gearing 4.

The second step of the gearing includes the sun gear 13 and planetary gear 3 which are rotatably supported on a planet carrier 8 which is axially spaced from the planet carrier 7 and which includes an internal gear 12 which is in mesh with gearing 14 carried on the output shaft 15. The planet gear 3 is in mesh with the other part of the internal gear 4 of the casing 18. The internal teeth of the internal gear of the planet carrier 7 of the first step meshes with the sun wheel 13 of the second step and the internal gearing 12 of the planet carrier 8 meshes with the teeth of the gearing 14 of the output shaft 15.

In accordance with a feature of the invention the carriers 7 and 8 are provided with axially extending trunnions which form receiving bearings for the respective planet gears 2 and 3. The planet gears 2 and 3 are fitted on the trunnions loosely, that is without being fixed in an axial direction. Radially extending disks 5 and 20 respectively support the planetary gears 3 and 2 on the side turned toward the respective planet carrier 8 and 7. In the other axial direction the planet gear 3 is limited in axial movement by axially extending shoulder formation 6 of the carrier 9 which forms a check shoulder to check the axial displaceable movement of the planetary gear 3. The shoulder 6 is located on a radially inward end of the gearing. The planetary gear 2 is held in position by a radially outward shoulder formation or check shoulder 17 which is formed in a casing cover 16.

The planet gears 2 and 3 are mounted in an overhung manner, that is, their mounting trunnions are secured and supported on only one end and are fixed to their associated carriers 9 and 8. They are held against axial withdrawal from their mountings by the check shoulders 17 and 6, respectively.

The internal gearing 4 of the casing 18 is common for all of the steps of the gearing. The construction makes the design very compact so that the arrangement may be substantially without any interspaces between the individual component parts.

While a specific embodiment of the invention has been shown and described in detail to illustrate the application of the principles of the invention, it will be understood that the invention may be embodied otherwise without departing from such principles.

What is claimed is:

1. A planetary gearing, comprising a casing having an internal gear, a first shaft having one end rotatably supported in one end of said casing, a first sun gear in said casing, means freely rotatably supporting said sun gear in said casing, a casing cover at the opposite end of said casing from said first shaft, a second shaft journalled in said casing cover, a second sun gear affixed to said second shaft, a plurality of planetary gear carriers having internal gearing arranged in axially spaced relationship with each other in said casing, at least one of said carriers having an internal gear geared to said first shaft and at least one having its internal gear engaged with said first sun gear, each carrier having an axially extending trunnion defining an overhung planetary gear mounting, a planetary gear loosely journalled on each planetary gear mounting, and means defining check shoulders alongside each of said carriers forming bearing contacts engageable with said planetary gearing thereon and retaining said planetary gears on said trunnions against axial movement.

2. A planetary gearing according to claim 1 wherein said means defining check shoulders comprise an axially extending wall portion of an adjacent carrier.

3. A planetary gearing according to claim 2 wherein said means defining a check shoulder comprises an axially extending portion of said cover casing.

4. A planetary gearing according to claim 3 wherein said means defining a check shoulder also comprises an axially extending portion of an adjacent carrier.

5. A planetary gearing according to claim 1 wherein said second shaft comprises an input shaft, said first shaft comprising an output shaft, said input shaft having an input sun gear thereon with a hub portion, said first sun gear being freely rotatably about the hub portion of said input shaft sun gear, one of said carriers having a planetary gear in meshing engagement with said input shaft sun gear.

6. A planetary gearing according to claim 5 wherein said casing cover includes an axially inwardly extending portion at its outer periphery extending into bearing engagement with said planetary gear of the next adjacent carrier, said next adjacent carrier having an axially extending portion at the radially inner part thereof extending into axial engagement with the planetary gear of the next adjacent carrier.

* * * * *